(12) United States Patent
Shin et al.

(10) Patent No.: US 12,732,022 B2
(45) Date of Patent: Sep. 8, 2026

(54) ELECTRONIC DEVICE AND METHOD FOR TRANSMITTING WIRELESS POWER BASED ON ADAPTIVE OPERATING VOLTAGE IN ELECTRONIC DEVICE

(71) Applicant: SAMSUNG ELECTRONICS CO., LTD., Suwon-si (KR)

(72) Inventors: Seungshik Shin, Suwon-si (KR); Taewoong Kim, Suwon-si (KR); Baewon Park, Suwon-si (KR); Sungchul Park, Suwon-si (KR); Sehyoung Park, Suwon-si (KR); Jinsik Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 755 days.

(21) Appl. No.: 18/113,825

(22) Filed: Feb. 24, 2023

(65) Prior Publication Data

US 2023/0268771 A1 Aug. 24, 2023

Related U.S. Application Data

(63) Continuation of application No. PCT/KR2021/011146, filed on Aug. 20, 2021.

(30) Foreign Application Priority Data

Aug. 25, 2020 (KR) ........................ 10-2020-0107367

(51) Int. Cl.
*H02J 50/10* (2016.01)
*H02J 7/90* (2026.01)
*H02J 50/80* (2016.01)

(52) U.S. Cl.
CPC ............. *H02J 50/10* (2016.02); *H02J 7/933* (2026.01); *H02J 50/80* (2016.02)

(58) Field of Classification Search
CPC ........ H02J 50/10; H02J 7/00712; H02J 50/80; H02J 7/00045; H02J 7/02; H02J 50/12;
(Continued)

(56) References Cited

U.S. PATENT DOCUMENTS 8,278,784 B2 * 10/2012 Cook .................. H01Q 1/2225 307/149
8,884,581 B2 11/2014 Widmer et al.
(Continued)

FOREIGN PATENT DOCUMENTS

JP 2013-212033 10/2013
JP 2015-126635 7/2015
(Continued)

OTHER PUBLICATIONS

Korean Office Action issued Dec. 2, 2024 in corresponding Korean Patent Application No. 10-2020-0107367.
(Continued)

*Primary Examiner* — M Baye Diao
(74) *Attorney, Agent, or Firm* — NIXON & VANDERHYE P.C.

(57) ABSTRACT

According to various embodiments, an electronic device comprises: a power supply unit comprising a power supply; an antenna module including at least one antenna; a magnetic field control circuit electrically connected to the antenna module; a charging circuit electrically connected to the power supply unit and the magnetic field control circuit; and at least one processor electrically connected to the magnetic field control circuit and the charging circuit, wherein the at least one processor may be configured to: identify an operating frequency through the magnetic field control circuit during the transmission of wireless power outside of the electronic device through the antenna module using power supplied from the power supply unit, identify
(Continued)

whether the confirmed operating frequency is included in at least one operating voltage change frequency section within the designated operating frequency range, and change the operating voltage of the charging circuit based on the operating frequency being included in the at least one operating voltage change frequency section.

13 Claims, 11 Drawing Sheets

(58) Field of Classification Search
CPC .. H02J 50/90; H02J 50/05; H04B 5/26; H04B 5/79; G08B 21/182
USPC .......................................................... 320/108
See application file for complete search history.

(56) References Cited

U.S. PATENT DOCUMENTS

| | | | | |
|---|---|---|---|---|
| 9,818,530 | B2 | 11/2017 | Muratov et al. | |
| 10,461,583 | B2 * | 10/2019 | Yeo | H02J 50/12 |
| 10,630,073 | B2 * | 4/2020 | Taya | G05F 1/575 |
| 12,057,712 | B2 * | 8/2024 | Shin | H01Q 1/38 |
| 2011/0304216 | A1 * | 12/2011 | Baarman | H02J 50/12 307/104 |
| 2013/0099734 | A1 | 4/2013 | Lee et al. | |
| 2014/0191568 | A1 * | 7/2014 | Partovi | H01F 38/14 307/31 |
| 2014/0246920 | A1 | 9/2014 | Bae | |
| 2014/0333147 | A1 | 11/2014 | Lee et al. | |
| 2014/0361636 | A1 | 12/2014 | Endo et al. | |
| 2015/0188363 | A1 | 7/2015 | Yamada | |
| 2015/0270739 | A1 | 9/2015 | Keeling et al. | |
| 2015/0372493 | A1 | 12/2015 | Sankar | |
| 2016/0221459 | A1 | 8/2016 | Jung et al. | |
| 2017/0133889 | A1 * | 5/2017 | Yeo | H02J 50/12 |
| 2017/0179770 | A1 | 6/2017 | Kanno | |
| 2018/0102668 | A1 | 4/2018 | Hong et al. | |
| 2018/0159371 | A1 * | 6/2018 | Kim | H02J 7/42 |
| 2018/0351391 | A1 | 12/2018 | Park | |
| 2020/0021126 | A1 * | 1/2020 | Seo | H02J 50/12 |
| 2020/0119580 | A1 | 4/2020 | Park et al. | |

FOREIGN PATENT DOCUMENTS

| | | |
|---|---|---|
| JP | 2018-170820 | 11/2018 |
| KR | 10-2012-0077448 | 7/2012 |
| KR | 10-2013-0045215 | 5/2013 |
| KR | 10-2013-0130191 | 12/2013 |
| KR | 10-2015-0045602 | 4/2015 |
| KR | 10-2016-0135223 | 11/2016 |
| KR | 10-2017-0045046 | 4/2017 |
| KR | 10-1741759 | 5/2017 |
| KR | 10-2017-0061787 | 6/2017 |
| KR | 10-1752250 | 6/2017 |
| KR | 10-2018-0064238 | 6/2018 |
| KR | 10-2018-0073535 | 7/2018 |
| KR | 10-2020-0073834 | 6/2020 |
| WO | 2016/019159 | 2/2016 |

OTHER PUBLICATIONS

Extended European Search Report dated Dec. 15, 2023 issued in European Patent Application No. 21861982.3.
International Search Report for PCT/KR2021/011146 mailed Dec. 6, 2021, 3 pages.
Written Opinion of the ISA for PCT/KR2021/011146 mailed Dec. 6, 2021, 5 pages.
Notice of Allowance for KR Application No. 10-2020-0107367 dated Jan. 27, 2026, 7 pages.
Office Action for IN Application No. 202337014003 dated Feb. 26, 2026, 7 pages.

* cited by examiner

ELECTRONIC DEVICE AND METHOD FOR TRANSMITTING WIRELESS POWER BASED ON ADAPTIVE OPERATING VOLTAGE IN ELECTRONIC DEVICE

CROSS-REFERENCE TO RELATED APPLICATIONS

This application is a continuation of International Application No. PCT/KR2021/011146 designating the United States, filed on Aug. 20, 2021, in the Korean Intellectual Property Receiving Office and claiming priority to Korean Patent Application No. 10-2020-0107367, filed on Aug. 25, 2020, in the Korean Intellectual Property Office, the disclosures of which are incorporated by reference herein in their entireties.

BACKGROUND

Field

The disclosure relates to an electronic device and a method of transmitting wireless power in the electronic device.

Description of Related Art

Along with the development of wireless power transfer technology, many electronic devices have recently used the wireless power transmission technology for wireless charging or contactless charging. In the wireless power transfer technology, electrical energy is converted into electromagnetic waves having a frequency and wirelessly transferred to a load without a transmission line. The wireless power transfer technology may refer, for example, to a technology of wirelessly transmitting power from a power transmission device to a power reception device without a wired connection between them and charging a battery of the power reception device with the power. The wireless power transfer technology may include a magnetic induction scheme and a magnetic resonance scheme. Besides them, there may be various other types of wireless power transfer schemes.

For example, a magnetic induction-based wireless power transmission system uses a magnetic field induced in a coil to transmit power. Energy is supplied to a load by allowing an induced current to flow in a reception coil using a magnetic field generated from a current flowing in a transmission coil. Key magnetic induction standards include wireless power consortium (WPC), power matters alliance (PMA), and so on. A specified frequency band may be used for power transmission, such as 110 kHz to 205 kHz in WPC, and 227 kHz to 357 kHz and 118 kHz to 153 kHz in PMA.

In another example, a magnetic resonance-based wireless power transmission system transmits and receives power using resonance between two coils having the same resonant frequency. Alliance for wireless power (A4WP) is a key magnetic resonance standard, in which a specified resonant frequency such as 6.78 MHz may be used.

When an electronic device (or a wireless power transmission device) wirelessly transmits power to an external electronic device (or a wireless power reception device), it may receive reception power information (e.g., a control error packet (CEP)) about power received by the external electronic device from the external electronic device, and control wireless transmission power.

For example, the electronic device may control (or regulate) power to be supplied to the external electronic device by adjusting an operating frequency or/and a duty at a specified voltage (e.g., a fixed operating voltage). When the electronic device adjusts power with a frequency or/and a duty at a fixed operating voltage, it may face limitations in power control because a frequency or/and duty control range is specified.

SUMMARY

Embodiments of the disclosure may provide an electronic device for increasing power transmission efficiency by adjusting an operating frequency and a duty on an operating voltage basis, while adaptively changing an operating voltage, and a method of transmitting wireless power based on an adaptive operating voltage in the electronic device.

According to various example embodiments, an electronic device may include: a power supply unit comprising a power supply, an antenna module comprising at least one antenna, a magnetic field controller circuit electrically connected to the antenna module, a charging circuit electrically connected to the power supply unit and the magnetic field controller circuit, a memory and at least one processor electrically connected to the magnetic field controller circuit, the charging circuit, and the memory. The at least one processor may be configured to: identify an operating frequency through the magnetic field controller circuit during wireless power transmission to outside of the electronic device through the antenna module using power supplied from the power supply unit, identify whether the identified operating frequency is included in at least one operating voltage-changing frequency section within a specified operating frequency range, and based on the operating frequency being included in the at least one operating voltage-changing frequency section, change an operating voltage of the charging circuit.

According to various example embodiments, a method of transmitting wireless power based on an adaptive operating voltage in an electronic device may include: identifying an operating frequency through a magnetic field controller circuit during wireless power transmission to outside of the electronic device through an antenna module, identifying whether the identified operating frequency is included in at least one operating voltage-changing frequency section within a specified operating frequency range, and based on the operating frequency being included in the at least one operating voltage-changing frequency section, changing an operating voltage of a charging circuit.

According to various example embodiments, a non-transitory computer-readable storage medium storing instructions which, when executed by at least one processor of an electronic device, cause the electronic device to perform at least one operation, the at least one operation comprising: identifying an operating frequency through a magnetic field controller circuit during wireless power transmission to outside of the electronic device through an antenna module, identifying whether the identified operating frequency is included in at least one operating voltage-changing frequency section within a specified operating frequency range, and based on the operating frequency being included in the at least one operating voltage-changing frequency section, changing an operating voltage of a charging circuit.

According to various example embodiments, an electronic device may increase power transmission efficiency by adjusting an operating frequency and a duty on an operating voltage basis while adaptively changing an operating voltage.

According to various example embodiments, when an operating frequency is lower than a lowest frequency within a specified operating frequency range or higher than a highest frequency within the specified operating frequency range during wireless power transmission, an electronic device may adaptively change an operating voltage to increase power transmission efficiency, widen a charging recognition area, and thus secure charging safety.

The effects achievable from the disclosure are not limited to what has been described above, and other unmentioned effects may be clearly understood by those skilled in the art from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

The terms used in the disclosure are merely used to describe various example embodiments, and are not intended to limit the scope of the disclosure or the various embodiments. Singular forms may include plural referents unless the context clearly dictates otherwise. The terms including technical or scientific terms used in the disclosure may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. Even the terms defined in the disclosure may not be interpreted as excluding embodiments of the disclosure.

Figure 1:
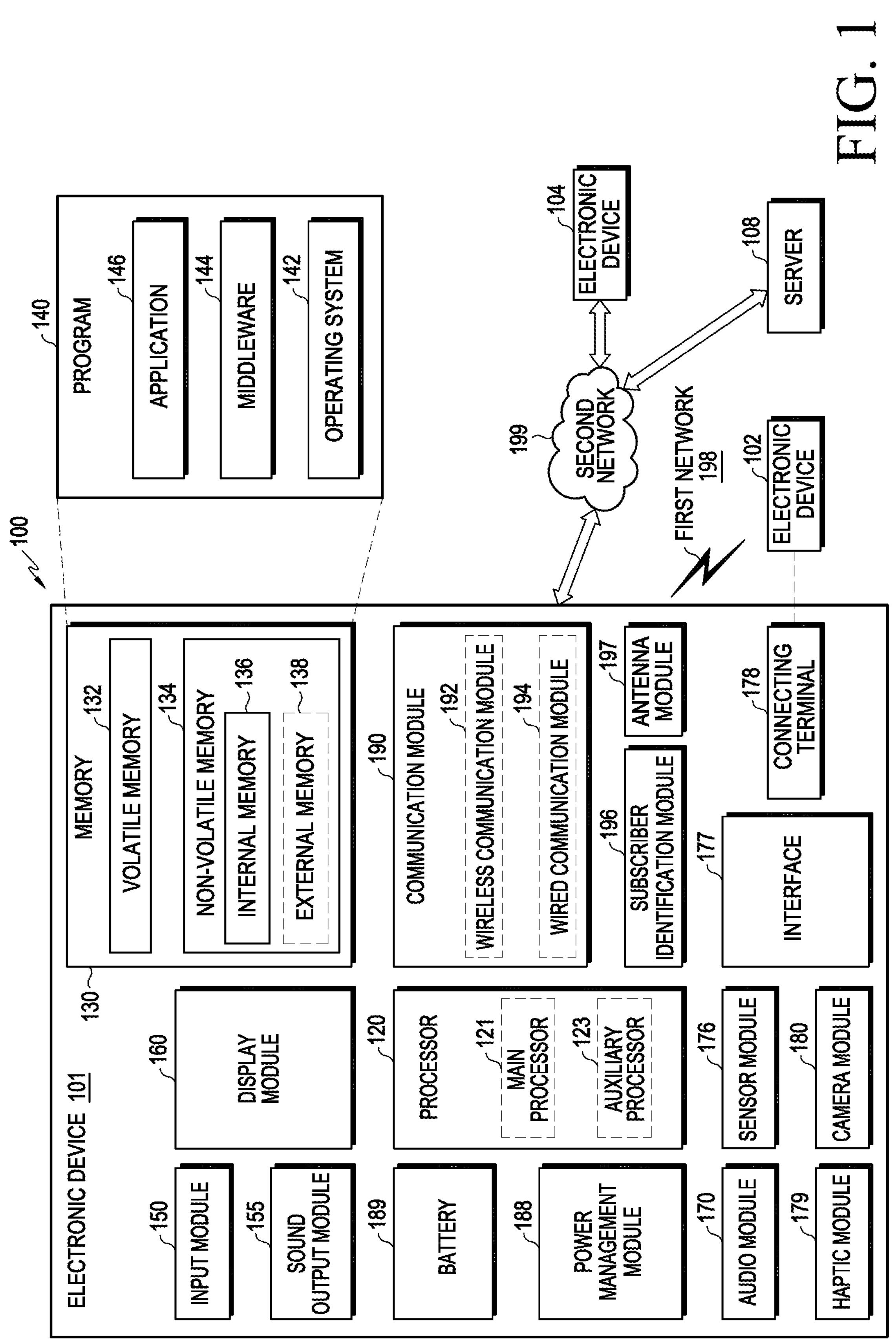
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a specified high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the specified high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
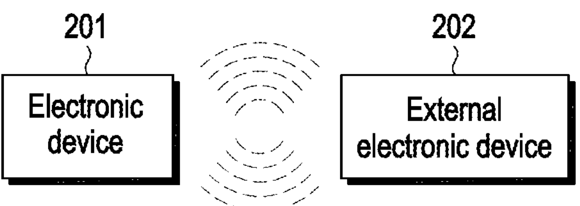
FIG. 2 is a diagram illustrating an electronic device and an external electronic device according to various embodiments.

FIG. 2 is a diagram illustrating an electronic device and an external electronic device according to various embodiments.

Referring to FIG. 2, an electronic device 201 (e.g., the electronic device 101 of FIG. 1) according to an embodiment may be a wireless power transmission device, and an external electronic device 202 may be a wireless power reception (receiving) device. The electronic device 201 according to an embodiment may transmit a wireless power signal and data related to wireless power transmission to the external electronic device 202 in an in-band manner.

Figure 3:
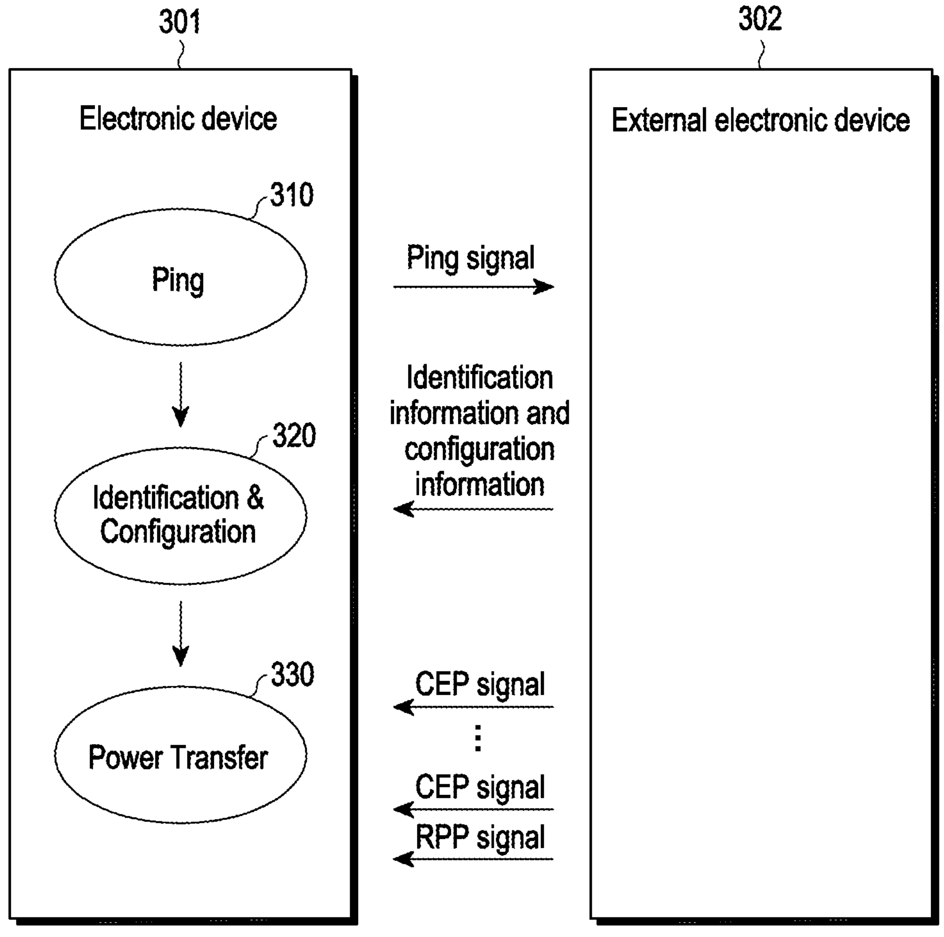
FIG. 3 is a diagram illustrating example operation phases for power transmission from an electronic device to an external electronic device according to various embodiments.

FIG. 3 is a diagram illustrating example operation phases for power transmission from an electronic device to an external electronic device according to various embodiments.

Referring to FIG. 3, according to an embodiment, an electronic device 301 (e.g., the electronic device 101 of FIG. 1 or the electronic device 201 of FIG. 2) may transmit and/or receive at least one signal corresponding to a ping phase 310, an identification & configuration phase 320, and/or a power transfer phase 330 to supply power to an external electronic device 302 (e.g., the electronic device 201 of FIG. 2).

According to an embodiment, the electronic device 301 may transmit a ping signal, for example, a digital ping signal or an analog ping signal in the ping phase 310. For example, the electronic device 301 may periodically transmit the ping signal based on a power transmission request.

According to an embodiment, the electronic device 301 may identify (sense or detect) the external electronic device 302 based on reception of a response corresponding to the ping signal from the external electronic device 302.

According to an embodiment, as the electronic device 301 may identify the external electronic device 302, the electronic device 301 may receive identification information and configuration information for authenticating a power reception device from the external electronic device 302 in the identification & configuration phase 320. The identification information may include information identifying the external electronic device 302, and the configuration information may include various types of information required for the external electronic device 302 to receive power. The electronic device 301 may authenticate the external electronic device 302 based on the identification information and the configuration information from the external electronic device 302.

According to an embodiment, the electronic device 301 may receive charging mode information (e.g., a normal charging mode or a low power charging mode) from the external electronic device 302 and transmit power supply information related to the charging mode information to the external electronic device 302. The power supply information related to a charging mode may include a transmission voltage, a power value, a frequency, and a parameter value for power transmission. The external electronic device 302 may set a charging mode based on the power supply information related to the charging mode information.

According to an embodiment, upon completion of the authentication (or the authentication and charging mode setting), the electronic device 301 may transmit a power signal for wireless power transmission to the external electronic device 302 in the power transfer phase 330. According to an embodiment, the electronic device 301 may receive at least one control error packet (CEP) signal and a received power packet (RPP) signal from the external electronic device 302 in the power transfer phase 330. The CEP signal may include information indicating the magnitude of transmission power to be transmitted from the electronic device 301, and the RPP signal may include information indicating the magnitude of reception power received at the external electronic device 302. The electronic device 302 may adjust transmission power based on the CEP signal or/and the RPP signal.

According to an embodiment, the electronic device 301 may adjust transmission power by adjusting an operating frequency and/or an operating voltage in a specified operating voltage range (e.g., 5V to 7.5V or 8V to 10.5V) and a specified operating frequency range (e.g., 100khz to 148khz).

According to an embodiment, when transmitting first power using a first operating voltage (e.g., a default operating voltage, 6V, 10V, or any other voltage), the electronic device 301 may identify a first operating frequency. When the operating frequency is between a first operating frequency threshold (e.g., a low threshold) and a second operating frequency threshold (e.g., a high threshold) within the specified operating frequency range, the electronic device 301 may adjust the transmission power by changing the first operating frequency between the first operating frequency threshold and the second operating frequency threshold without changing the first operating voltage.

According to an embodiment, when transmitting the first power using the first operating voltage (e.g., the default operating voltage, 6V, or 10V), the electronic device 301 may identify the first operating frequency. When the operating frequency is equal to or lower than the first operating frequency threshold (e.g., the low threshold) within the specified operating frequency range, the electronic device 301 may adjust the transmission power by changing the first operating voltage to a second operating voltage greater than the first operating voltage.

According to an embodiment, when transmitting the first power using the first operating voltage (e.g., the default operating voltage, 6V, 10V, or any other voltage), the electronic device 301 may identify the first operating frequency. When the operating frequency is equal to or higher than the second operating frequency threshold (e.g., the high threshold) within the specified operating frequency range, the electronic device 301 may adjust the transmission power by changing the first operating voltage to a third operating voltage less than the first operating voltage.

According to an embodiment, when an operating voltage is a highest voltage within the specified operating voltage range and an operating frequency is lower than a lowest frequency within the specified operating frequency range during power transmission, the electronic device 301 may transmit a notification message indicating that power transmission is not performed normally to the external electronic device 302. For example, the notification message may include information indicating that an exterior cover of the electronic device 301 should be removed or/and adjustment is required to align the electronic device 301 and the external electronic device 302 at positions for wireless power transmission. According to an embodiment, when the operating voltage is the highest voltage within the specified operating voltage range, and the operating frequency is lower than the lowest frequency within the specified operating frequency range during power transmission, the electronic device 301 may transmit the notification message and discontinue the power transmission operation.

Figure 4:
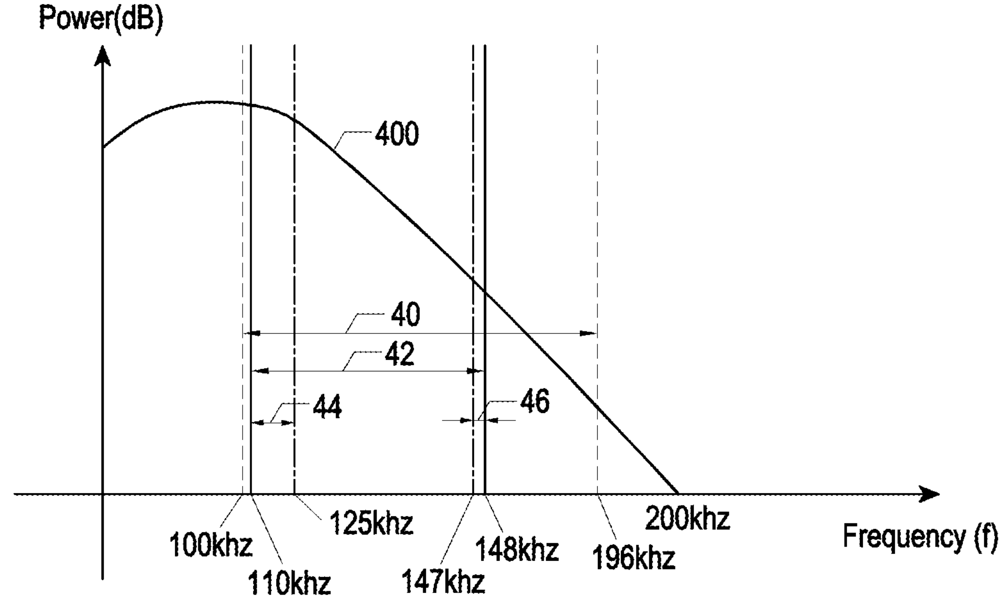
FIG. 4 is a graph illustrating a power relationship with respect to the frequency of a wireless transmission power signal in an electronic device according to various embodiments.

FIG. 4 is a graph illustrating a power relationship with respect to the frequency of a wireless transmission power signal in an electronic device according to various embodiments.

Referring to FIG. 4, a horizontal axis may represent the frequency f of a transmission power signal, and a vertical axis may represent a power magnitude dB according to an embodiment. A curve 400 may represent a power relationship with respect to the frequency of a wireless transmission power signal. According to various embodiments, the frequency range of the transmission power signal may be specified. According to an embodiment, the frequency range of the transmission signal may be at least part or all of a frequency range (e.g., 100khz to 196khz) 40 as defined in the WPC standard. According to an embodiment, a specified operating frequency range 42 of the transmission power signal may be approximately 110khz to 148khz. According to an embodiment, the first operating frequency threshold (e.g., the low threshold) within the specified operating frequency range may be about 125khz, and the second operating frequency threshold (e.g., the high threshold) within the specified operating frequency range may be about 147khz.

According to an embodiment, when an operating frequency is in a section between the first operating frequency threshold (e.g., the low threshold) and the second operating frequency threshold (e.g., the high threshold) within the specified operating frequency range during power transmission, the electronic device 301 may adjust transmission power by changing the operating frequency between the first operating frequency threshold and the second operating frequency threshold without changing an operating voltage.

According to an embodiment, when the operating frequency is in a section 44 equal to or lower than the first operating frequency threshold (e.g., the low threshold) within the specified operating frequency range during power transmission, the electronic device 301 may adjust the transmission power by increasing the operating voltage.

According to an embodiment, when the operating frequency is in a section 46 higher than the second operating frequency threshold (e.g., the high threshold) within the specified operating frequency range during power transmission, the electronic device 301 may adjust the transmission power by decreasing the operating voltage.

Figure 5:
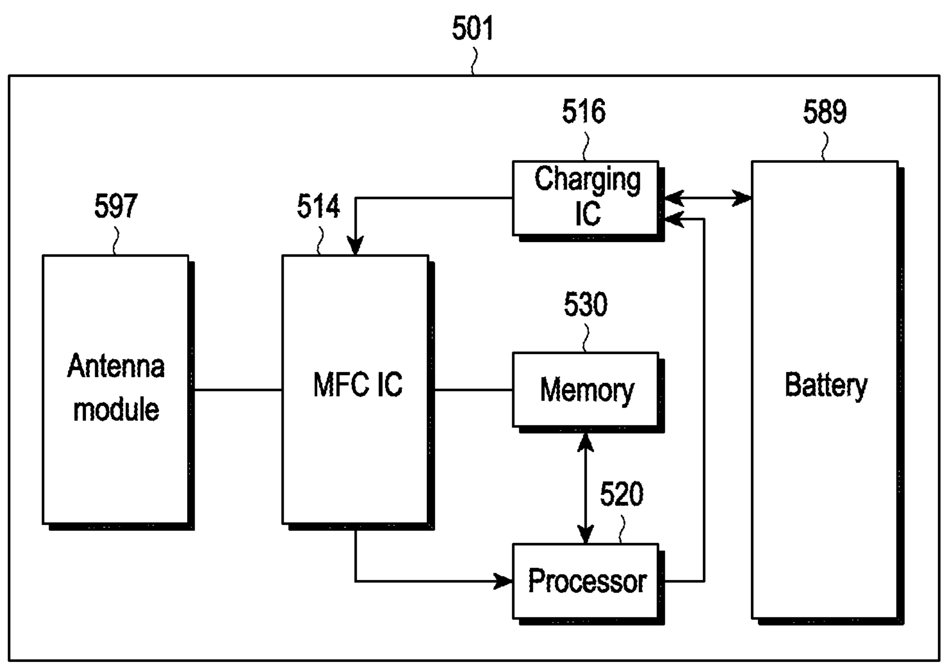
FIG. 5 is a block diagram illustrating an example configuration of an electronic device according to various embodiments.

FIG. 5 is a block diagram illustrating an example configuration of an electronic device according to various embodiments.

Referring to FIG. 5, an electronic device 501 (e.g., the electronic device 101 of FIG. 1, the electronic device 201 of FIG. 2, or the electronic device 301 of FIG. 3) according to an embodiment may include some or all of an antenna module (e.g., including at least one antenna) 597 (e.g., the antenna module 197 of FIG. 1), a magnetic field controller integrated circuit (MFC IC) 514, a charging IC (or charger IC) 516, a processor (e.g., including processing circuitry) 520 (e.g., the processor 120 of FIG. 1), memory 530 (e.g., the memory 130 of FIG. 1), and a battery 589 (e.g., the battery 189 of FIG. 1).

The antenna module 597 according to an embodiment may include an antenna including at least one coil. For example, the antenna module 597 may include a multi-coil antenna in which a plurality of coils are integrally packaged. According to an embodiment, the plurality of coils may include a coil for wireless power transmission and reception (e.g., near field magnetic induction (NFMI)) and further include coils for other purposes. For example, the coils for other purposes may be a coil for magnetic secure transmission (e.g., a magnetic secure transmission (MST) coil) or/and a coil for near field communication (NFC).

The MFC IC 514 according to an embodiment may be connected to the antenna module 597. According to an embodiment, the MFC IC 514 may be connected to the antenna module 597 to perform a wireless power reception operation or a wireless power transmission operation. According to an embodiment, the MFC IC 514 may include a wireless power reception circuit (not shown) for wireless power reception and a wireless power transmission circuit (not shown) for wireless power transmission. For example, when receiving wireless power, the wireless power reception circuit may perform a power process of rectifying power of an AC waveform received through the at least one coil of the antenna module 597 into power of a DC waveform, converting a voltage, or regulating power, and transfer the processed power to the charging IC 516. For example, when transmitting wireless power, the wireless power transmission circuit may receive power from the charging IC 516, generate an AC waveform for power transmission, generate a magnetic field in the at least one coil of the antenna module 497 based on the generated AC waveform, and transmit wireless power through the magnetic field. The MFC IC 514 according to an embodiment may control the frequency and/or duty of a wireless power transmission signal based on a power control packet (e.g., CEP) received from an external electronic device, and periodically transfer an operating frequency to the processor 520.

The charging IC 516 according to an embodiment may be connected between the MFC IC 514 and the battery 589. The charging IC 516 according to an embodiment may charge the battery 589 with power received through the MFC IC 514, and supply power to the MFC IC 514 based on an operating voltage from the battery 589. The charging IC 516 according to an embodiment may change the operating voltage within a specified range based on operating voltage control of the processor 520. The MFC IC 514 may form a magnetic field in the antenna module 597 using the received power and wirelessly transmit the power to the external electronic device. For example, the MFC IC 514 may enable power from the battery 589 to be wirelessly shared with the external electronic device. According to various embodiments, the external electronic device may be one of various types of external electronic devices. For example, the various types of external electronic devices may include a smartphone, an accessory device capable of interacting with the electronic device 501, or a smart watch. Besides, any electronic device capable of wirelessly receiving power from the electronic device 501 may be available.

According to an embodiment, the processor 520 (e.g., processor 120 of FIG. 1) may include various processing circuitry and adjust transmission power by controlling to adjust an operating frequency or/and an operating voltage in a specified operating voltage range (e.g., 5V to 7.5V, 8V to 10.5V, or any other voltage range) and a specified operating frequency range (e.g., approximately 110khz to 148khz).

According to an embodiment, the processor 520 may identify an operating frequency during wireless power transmission to an external electronic device (e.g., the external electronic device 302 of FIG. 3) and identify whether the identified operating frequency belongs to at least one operating voltage-changing frequency section within the specified operating frequency range. For example, the at least one operating voltage-changing frequency section may include a section (e.g., a first operating voltage-changing frequency section) from a lowest frequency (e.g., about 100khz) to a first operating frequency threshold (e.g., a low threshold) (e.g., about 125khz) within the specified operating frequency range (e.g., about 100khz to 148khz) or/and a section (e.g., a second operating voltage-changing frequency section) from a second operating frequency threshold (e.g., a high threshold) (e.g., about 147khz) to a highest frequency (e.g., about 148khz) within the specified operating frequency range. When the operating frequency belongs to at least one operating voltage-changing frequency section within the specified operating frequency range, the processor 520 according to an embodiment may supply power by changing the operating voltage. When the operating frequency does not belong to at least one operating voltage-changing frequency section within the specified operating frequency range, the processor 520 according to an embodiment may supply power without changing the operating voltage.

According to an embodiment, the processor 520 may identify a first operating frequency based on operating frequency information received from the MFC IC 514 and identify whether to change an operating voltage by comparing the first operating frequency with at least one operating frequency threshold (e.g., the first operating frequency threshold (e.g., the low threshold) or/and the second operating frequency threshold (e.g., the high threshold)) within the specified operating frequency range during power transmission using a first operating voltage (e.g., a default operating voltage, 6V, 9V, or any other voltage) within a specified operating voltage range (e.g., about 5V to 7.5V, about 8V to 10.5V, or any other voltage range).

According to an embodiment, when the first operating frequency is between the first operating frequency threshold (e.g., the low threshold) and the second operating frequency threshold (e.g., the high threshold) within the specified operating frequency range, the processor 520 may control to change the first operating frequency between the first operating frequency threshold and the second operating frequency threshold without changing the first operating voltage.

According to an embodiment, when the first operating frequency is equal to or lower than the first operating frequency threshold (e.g., the low threshold) within the specified operating frequency range during power transmission using the first operating voltage (e.g., the default operating voltage, 6V, 9V, or any other voltage), the processor 520 may control the charging IC 516 to supply power based on a second operating voltage to the MFC IC 514 by controlling the charging IC 516 to change the first operating voltage to the second operating voltage greater than the first operating voltage.

According to an embodiment, when the first operating frequency is equal to or higher than the second operating frequency threshold (e.g., the high threshold) within the specified operating frequency range during power transmission using the first operating voltage (e.g., the default operating voltage, 6V, 9V, or any other voltage), the processor 520 may control the charging IC 516 to change the first operating voltage to a third operating voltage less than the first operating voltage, so that the charging IC 516 may supply power based on the third operating voltage to the MFC IC 514.

According to an embodiment, when an operating voltage is equal to or greater than a specified first voltage (e.g., a highest voltage) within the specified operating voltage range and an operating frequency is equal to or lower than a specified first frequency (e.g., a lowest frequency) within the specified operating frequency range during power transmission, the electronic device 301 may transmit a notification message indicating that power transmission is not performed normally to the external electronic device 302. For example, the notification message may include information indicating that the exterior cover of the electronic device 301 should be removed or/and adjustment is required to align the electronic device 301 and the external electronic device 302 at positions for wireless power transmission. According to an embodiment, when the operating voltage is equal to or greater than the specified first voltage (e.g., the highest voltage) within the specified operating voltage range, and the operating frequency is equal to or lower than the specified first frequency (e.g., the lowest frequency) within the specified operating frequency range during power transmission, the electronic device 301 may transmit the notification message and control the charging IC 516 and the MFC IC 514 to discontinue the power transmission operation. According to an embodiment, even though the operating voltage is the highest voltage within the specified operating voltage range, and the operating frequency is equal to or lower than the specified first frequency (e.g., the lowest frequency) within the specified operating frequency range during power transmission, if the electronic device 301 is receiving power from an external power source, the electronic device 301 may not transmit the notification message indicating power transmission is not performed normally.

The memory 530 (e.g., the memory 130 of FIG. 1) according to an embodiment may store instructions for performing (which when executed cause the electronic device to perform operations) an operation of the electronic device 501. According to various embodiments, the memory 530 may be implemented in various forms such as read only memory (ROM), random access memory (RAM), or flash memory, and the implementation type may not be limited. The memory 530 according to an embodiment may store various control data or/and data tables used by at least one component (e.g., the processor 520 or the MFC IC 514) of the electronic device 501. For example, the memory 530 may store a specified operating frequency range and a specified operating voltage range, and store information (e.g., a table) required for the processor 520 to change an operating voltage based on operating frequency information. For example, the information required for changing an operating voltage may be stored as illustrated in Table 1 below.

TABLE 1

| Operating voltage change information (operating) | Condition for starting operating voltage change (operating condition) | Condition for ending operating voltage change (stop condition) |
|---|---|---|
| Decrease operating voltage by specified voltage (e.g., decrease operating voltage by 0.5 V each time) | Operating voltage exceeds 5 V and operating frequency exceeds 147 khz | Operating voltage becomes 5 V or operating frequency is lower than 147 khz |
| Increase operating voltage by specified voltage (e.g., increase operating voltage by 0.5 V each time) | Operating voltage is lower than 7.5 V and operating frequency is lower than 120 khz | Operating voltage becomes 7.5 V or operating frequency is lower than 147 khz |

According to an embodiment, the processor 520 may change an operating voltage based on operating voltage change information in the condition for starting an operating voltage change based on Table 1, and end (or stop) the operating voltage change when the condition for ending the operating voltage change is satisfied.

According to various embodiments, an electronic device (e.g., the electronic device 101 of FIG. 1, the electronic device 201 of FIG. 2, the electronic device 301 of FIG. 3, or the electronic device 501 of FIG. 5) may include a power supply unit comprising a power supply (e.g., the battery 189 of FIG. 1 or the battery 589 of FIG. 5), an antenna module comprising at least one antenna (e.g., the antenna module 197 of FIG. 1 or the antenna module 597 of FIG. 5), a magnetic field controller circuit (e.g., the MFC IC 514 of FIG. 5) electrically connected to the antenna module, a charging circuit (e.g., the charging IC 516 of FIG. 5) electrically connected to the power supply unit and the magnetic field controller circuit, a memory and at least one processor (e.g., the processor 120 of FIG. 1 or the processor 520 of FIG. 5) electrically connected to the magnetic field controller circuit, the charging circuit, and the memory. The at least one processor may be configured to: identify an operating frequency through the magnetic field controller circuit during wireless power transmission to outside of the electronic device through the antenna module using power supplied from the power supply unit, identify whether the identified operating frequency is included in at least one operating voltage-changing frequency section within a specified operating frequency range, and based on the operating frequency being included in the at least one operating voltage-changing frequency section, change an operating voltage of the charging circuit.

According to various example embodiments, the at least one operating voltage-changing frequency section may include a first operating voltage-changing frequency section corresponding to a section from a lowest frequency to a first operating frequency threshold within the specified operating frequency range, or/and a second operating voltage-changing frequency section corresponding to a section from a second operating frequency threshold to a highest frequency within the specified operating frequency range.

According to various example embodiments, the at least one processor may be configured to, based on the operating frequency being in the first operating voltage-changing frequency section, change a first operating voltage of the charging circuit to a second operating voltage greater than the first operating voltage by a specified value.

According to various example embodiments, the at least one processor may be configured to, based on the operating frequency being in the second operating voltage-changing frequency section, change a first operating voltage of the charging circuit to a third operating voltage less than the first operating voltage by a specified value.

According to various example embodiments, the at least one processor may be configured to control to adjust power without changing the operating voltage, based on the operating frequency being between the first operating frequency threshold and the second operating frequency threshold.

According to various example embodiments, the operating voltage may be changed within a specified operating voltage range.

According to various embodiments, the at least one processor may be configured to control the electronic device to generate a message indicating that power transmission is not performed normally, based on the operating voltage being equal to or greater than a first voltage (e.g., a highest voltage) within the specified operating voltage range, and the operating frequency being equal to or lower than a first frequency (e.g., a lowest frequency) within the specified operating frequency range during the wireless power transmission.

According to various example embodiments, the at least one processor may be configured to discontinue the wireless power transmission, based on the operating voltage being equal to or greater than a first voltage (e.g., a highest voltage) within the specified operating voltage range, and the operating frequency being equal to or lower than a first frequency (e.g., a lowest frequency) within the specified operating frequency range during the wireless power transmission.

According to various example embodiments, the specified operating voltage range may include a range of 5V to 7.5V.

According to various example embodiments, the specified operating frequency range may be 110khz to 148khz, the first operating frequency threshold may be 125khz, and the second operating frequency threshold may be 147khz.

Figure 6:
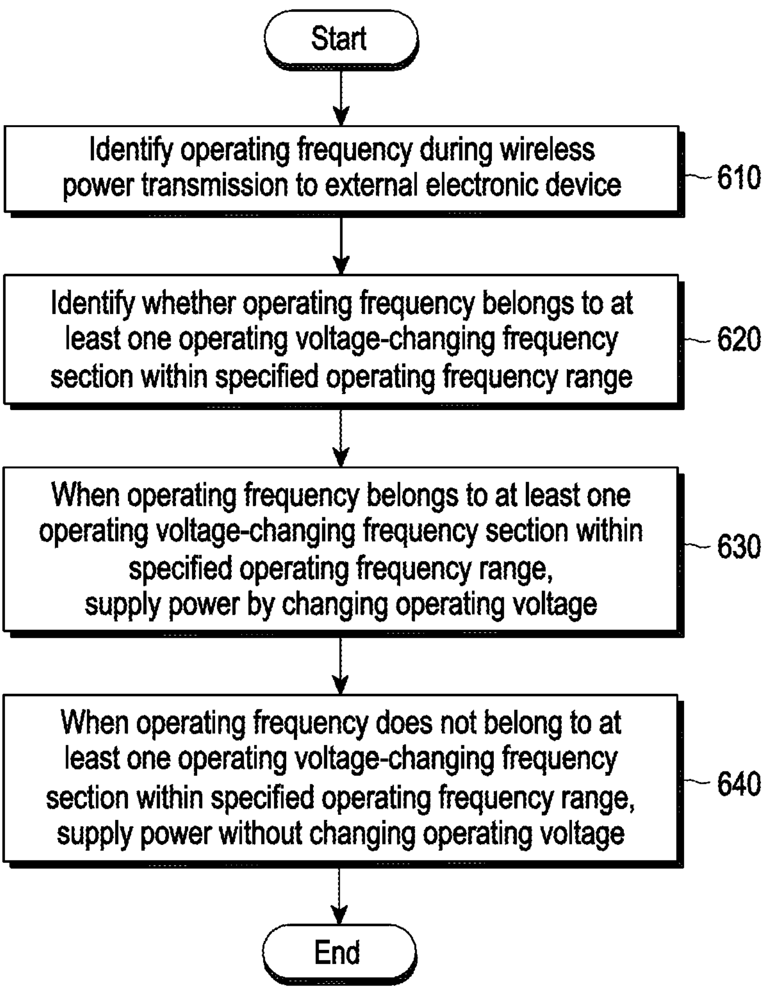
FIG. 6 is a flowchart illustrating an example operation of adaptively changing an operating voltage during wireless power transmission in an electronic device according to various embodiments.

FIG. 6 is a flowchart illustrating an example operation of adaptively changing an operating voltage during wireless power transmission in an electronic device according to various embodiments.

Referring to FIG. 6, a processor (e.g., the processor 120 of FIG. 1 or the processor 520 of FIG. 5) of an electronic device (e.g., the electronic device 101 of FIG. 1 or the electronic device 501 of FIG. 5) according to an embodiment may perform at least one of operations 610 to 640.

In operation 610, the processor 520 according to an embodiment may identify an operating frequency during wireless power transmission to an external electronic device (e.g., the external electronic device 302 of FIG. 3). For example, the processor 520 may identify a first operating frequency based on operating frequency information received from the MFC IC 414 during power transmission. For example, the processor 520 may transmit power to the external electronic device 302, using a first operating voltage within a specified operating range.

In operation 620, the processor 520 according to an embodiment may identify whether the identified operating frequency belongs to (e.g., includes) at least one operating voltage-changing frequency section within a specified operating frequency range (e.g., 100khz to 148khz). For example, the at least one frequency section related to an operating voltage change may include a section (e.g., a first operating voltage-changing frequency section) from a lowest frequency (e.g., about 100khz) to a first operating frequency threshold (e.g., a low threshold) (e.g., about 125khz) within the specified operating frequency range (e.g., about 100khz to 148khz) or/and a section (e.g., a second operating voltage-changing frequency section) from a second operating frequency threshold (e.g., a high threshold) (e.g., about 147khz) to a highest frequency (e.g., about 148khz) within the specified operating frequency range. According to an embodiment, when an operating voltage is equal to or greater than a specified first voltage (e.g., a highest voltage) within the specified operating voltage range, and an operating frequency is equal to or lower than a specified first frequency (e.g., a lowest frequency) within the specified operating frequency range during power transmission, the processor 520 may control to transmit a notification message indicating that power transmission is not performed normally to the external electronic device 302. For example, the notification message may include information indicating that the exterior cover of the electronic device 501 should be removed or/and adjustment is required to align the external electronic device 302 at a position for wireless power transmission with respect to the electronic device 501. According to an embodiment, when the operating voltage is equal to or greater than the specified first voltage (e.g., the highest voltage) within the specified operating voltage range, and the operating frequency is equal to or lower than the specified first frequency (e.g., the lowest frequency) within the specified operating frequency range during power transmission, the processor 520 may transmit the notification message and control the charging IC 516 and the MFC IC 514 to discontinue the power transmission operation. According to an embodiment, even though the operating voltage is equal to or greater than the highest voltage within the specified operating voltage range, and the operating frequency is equal to or lower than the specified first frequency (e.g., the lowest frequency) within the specified operating frequency range during power transmission, if the electronic device 501 is receiving power from an external power source, the processor 520 may not transmit the notification message indicating power transmission is not performed normally.

In operation 630, when the operating frequency belongs to at least one operating voltage-changing frequency section within the specified operating frequency range, the processor 520 according to an embodiment may supply power by changing the operating voltage. For example, when the first operating frequency belongs to the first operating voltage-changing frequency section, the processor 520 may control the charging IC 516 to change the first operating voltage to a second operating voltage greater than the first operating voltage, so that the charging IC 516 may supply power based on the second operating voltage to the MFC IC 514. Further, when the first operating frequency belongs to the second operating voltage-changing frequency section, the processor 520 may control the charging IC 516 to change the first operating voltage to a third operating voltage less than the first operating voltage, so that the charging IC 516 may supply power based on the third operating voltage to the MFC IC 514.

In operation 640, when the operating frequency does not belong to at least one operating voltage-changing frequency section within the specified operating frequency range, the processor 520 according to an embodiment may supply power without changing the operating voltage. For example, when the first operating frequency exists between the first operating frequency threshold (e.g., the low threshold) and the second operating frequency threshold (e.g., the high threshold) within the specified operating frequency range, the processor 520 according to an embodiment may control the MFC IC 514 to change the first operating frequency between the first operating frequency threshold and the second operating frequency threshold without changing the first operating voltage, so that power supplied to the MFC IC 514 based on the first operating voltage may be adjusted.

According to various example embodiments, a method of transmitting wireless power based on an adaptive operating voltage in an electronic device may include: identifying an operating frequency through a magnetic field controller circuit (e.g., the MFC IC 514 of FIG. 5) during wireless power transmission to outside of the electronic device through an antenna module (e.g., the external electronic device 302 of FIG. 3) identifying whether the identified operating frequency is included in at least one operating voltage-changing frequency section within a specified operating frequency range, and based on the operating frequency being included in the at least one operating voltage-changing frequency section, changing an operating voltage of a charging circuit.

According to various example embodiments, the at least one operating voltage-changing frequency section may include a first operating voltage-changing frequency section corresponding to a section from a lowest frequency to a first operating frequency threshold within the specified operating frequency range, and/or a second operating voltage-changing frequency section corresponding to a section from a second operating frequency threshold to a highest frequency within the specified operating frequency range.

According to various example embodiments, based on the operating frequency being in the first operating voltage-changing frequency section, a first operating voltage of the charging circuit may be changed to a second operating voltage greater than the first operating voltage by a specified value.

According to various example embodiments, based on the operating frequency being in the second operating voltage-changing frequency section, a first operating voltage of the charging circuit may be changed to a third operating voltage less than the first operating voltage by a specified value.

According to various example embodiments, the method may further include adjusting power without changing the operating voltage, based on the operating frequency being between the first operating frequency threshold and the second operating frequency threshold.

According to various example embodiments, the operating voltage may be changed within a specified operating voltage range.

According to various example embodiments, the method may further include generating a notification message indicating that power transmission is not performed normally, based on the operating voltage being equal to or greater than a first voltage (e.g., a highest voltage) within the specified operating voltage range, and the operating frequency being equal to or lower than a first frequency (e.g., a lowest frequency) within the specified operating frequency range during the wireless power transmission.

According to various example embodiments, the method may include discontinuing the wireless power transmission, based on the operating voltage being equal to or greater than a first voltage (e.g., a highest voltage) within the specified operating voltage range, and the operating frequency being equal to or lower than a first frequency (e.g., a lowest frequency) within the specified operating frequency range during the wireless power transmission.

According to various example embodiments, the specified operating voltage range may include a range of 5V to 7.5V.

Figure 7:
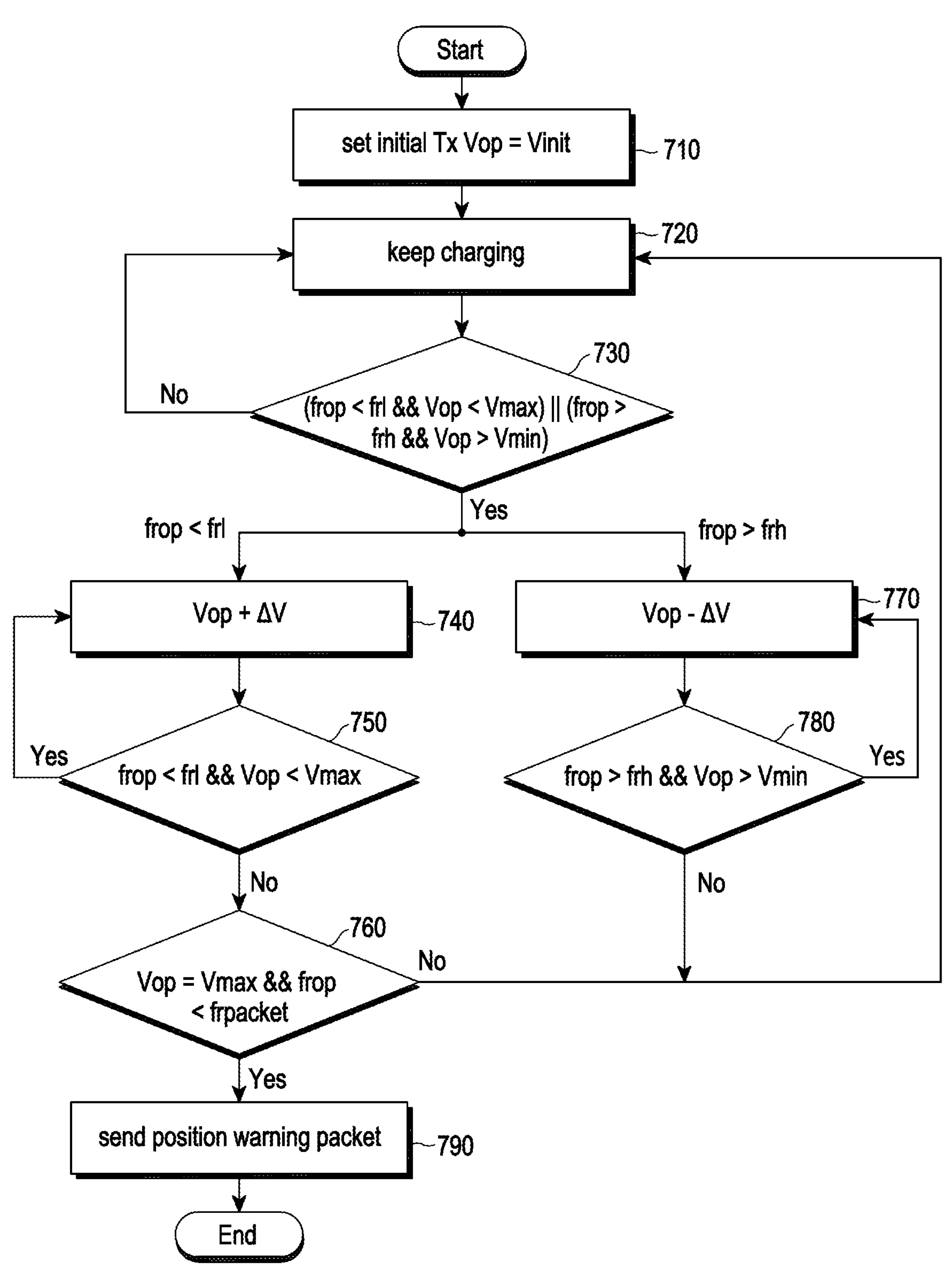
FIG. 7 is a flowchart illustrating an example wireless power transmission operation based on an adaptive operating voltage in an electronic device according to various embodiments.

FIG. 7 is a flowchart illustrating an example wireless power transmission operation based on an adaptive operating voltage in an electronic device according to various embodiments.

Referring to FIG. 7, a processor (e.g., the processor 120 of FIG. 1 or the processor 520 of FIG. 5) of an electronic device (e.g., the electronic device 101 of FIG. 1 or the electronic device 501 of FIG. 5) according to an embodiment may perform at least one of operations 710 to 790.

In operation 710, the processor 520 according to an embodiment may set an operating voltage based on starting wireless power transmission to an external electronic device (e.g., the external electronic device 302 of FIG. 3) (set initial Tx Vop (operating voltage)=Vinit (initial setting of Vop)). For example, the processor 520 may set the operating voltage for wireless power transmission to a first operating voltage (e.g., 6V) within a specified operating voltage range (e.g., 5V to 7.5V). According to an embodiment, the first operating voltage may be a preset default operating voltage. According to an embodiment, the first operating voltage may not be either a lowest voltage (e.g., 5V) or a highest voltage (e.g., 7.5V) within the specified operating voltage range (e.g., 5V to 7.5V).

In operation 720, the processor 520 according to an embodiment may perform wireless power transmission using the first operating voltage (keep charging).

In operation 730, the processor 520 according to an embodiment may identify whether an operating voltage is not either the lowest voltage (e.g., 5V) or the highest voltage (e.g., 7.5V) within the specified operating voltage range (e.g., 5V to 7.5V), and an operating frequency belongs to a section (e.g., a first operating voltage-changing frequency section) from a lowest frequency (e.g., 100khz) to a first operating frequency threshold (e.g., a low threshold) (e.g., 125khz) within a specified operating frequency range (e.g., 100khz to 148khz) or/and a section (e.g., a second operating voltage-changing frequency section) from a second operating frequency threshold (e.g., a high threshold) (e.g., 147khz) to a highest frequency (e.g., 148khz) within the specified operating frequency range during the wireless power transmission ((frop(operating frequency)<frl(low threshold of frop)&& Vop<Vmax(max value of Vop))|| (frop>frh(high threshold of frop)&&(Vop>Vmin(minimum value of Vop)).

When the operating voltage is the lowest voltage (e.g., 5V) and the highest voltage (e.g., 7.5V) within the specified operating voltage range (e.g., 5V to 7.5V), and the operating frequency does not belong to the section (e.g., the first operating voltage-changing frequency section) from the lowest frequency (e.g., 100khz) to the first operating frequency threshold (e.g., the low threshold) (e.g., 125khz) within the specified operating frequency range (e.g., 100khz to 148khz) or the section (e.g., the second operating voltage-changing frequency section) from the second operating frequency threshold (e.g., a high threshold) (e.g., 147khz) to the highest frequency (e.g., 148khz) within the specified operating frequency range during the wireless power transmission, the processor 520 according to an embodiment may perform the power transmission of operation 720 without changing the operating voltage. When the operating voltage is not either the lowest voltage (e.g., 5V) or the highest voltage (e.g., 7.5V) within the specified operating voltage range (e.g., 5V to 7.5V), and the operating frequency belongs to the section (e.g., the first operating voltage-changing frequency section) from the lowest frequency (e.g., 100khz) to the first operating frequency threshold (e.g., the low threshold) (e.g., 125khz) within the specified operating frequency range (e.g., 100khz to 148khz) or the section (e.g., the second operating voltage-changing frequency section) from the second operating frequency threshold (e.g., the high threshold) (e.g., 147khz) to the highest frequency (e.g., 148khz) within the specified operating frequency range during the wireless power transmission, the processor 520 according to an embodiment may perform a power changing operation in operation 740 or 750.

In operation 740, when the operating frequency is included in the section (e.g., the first operating voltage-changing frequency section) from the lowest frequency (e.g., 100khz) to the first operating frequency (e.g., the low threshold) (e.g., 125khz) (frop<frl), the processor 520 according to an embodiment may control the charging IC 516 to increase the operating voltage by a specified voltage value (Vop+ΔV (control level of voltage)).

In operation 750, after increasing the operating voltage by the specified voltage value, the processor 520 according to an embodiment may identify whether the operating frequency is lower than the second operating frequency threshold, and the operating voltage is less than the highest operating voltage within the specified frequency range (frop<frl(=frlhys(low threshold hysterisis level of frop)&& Vop<Vmax). According to an embodiment, when the operating frequency is lower than the second operating frequency threshold, and the operating voltage is less than the highest operating voltage within the specified frequency range after increasing the operating voltage by the specified voltage value, the processor 520 according to an embodiment may repeat operation 740 and operation 750 until the operating frequency is not lower than the second operating frequency threshold, or the operating voltage is not less than the highest operating voltage within the specified frequency range.

In operation 760, when the operating frequency is not lower than the second operating frequency threshold, or the operating voltage is not lower than the highest operating voltage within the specified frequency range after the operating voltage is increased by the specified voltage value, the processor 520 according to an embodiment may identify whether the operating voltage is equal to or greater than a specified first voltage (e.g., the highest voltage) within the specified operating voltage range and the operating frequency frop is equal to or lower than a specified first frequency (e.g., the lowest frequency or frpacket) within the specified operating frequency range (Vop=Vmax && frop<frpacket). Unless the operating voltage is equal to or greater than the specified first voltage (e.g., the highest voltage) within the specified operating voltage range and the operating frequency frop is equal to or lower than the specified first frequency (e.g., the lowest frequency or frpacket) within the specified operating frequency range, the processor 520 according to an embodiment may continue the power transmission. For example, the frequency frpacket may be a frequency based on which it is determined whether to transmit a notification message indicating that power transmission is not performed normally to a receiving side.

In operation 770, when the operating frequency is included in the section (e.g., the second operating voltage-changing frequency section) from the second operating threshold (e.g., the high threshold (e.g., 147khs)) to the highest frequency (e.g., 148khs) within the specified operating frequency range (frop<frh), the processor 520 according to an embodiment may control the charging IC 516 to decrease the operating voltage by a specified voltage value (Vop−ΔV (control level of voltage)).

In operation 780, after decreasing the operating voltage by the specified voltage value, the processor 520 according to an embodiment may identify whether the operating frequency is higher than the first operating frequency threshold, and the operating voltage is greater than the lowest operating voltage within the specified frequency range (frop>frh && Vop>Vmin). According to an embodiment, when the operating frequency is higher than the first operating frequency threshold, and the operating voltage is greater than the lowest operating voltage within the specified frequency range after the operating voltage is decreased by the specified voltage value, the processor 520 according to an embodiment may repeat operations 780 and 790 until the operating frequency is not higher than the first operating frequency threshold, or the operating voltage is not greater than the lowest operating voltage within the specified frequency range. When the operating frequency is not higher than the first operating frequency threshold, or the operating voltage is not greater than the lowest operating voltage within the specified frequency range, the processor 520 according to an embodiment may continue the power transmission.

In operation 790, when the operating voltage is equal to or greater than the specified first voltage (e.g., the highest voltage) within the specified operating voltage range and the operating frequency frop is equal to or lower than the specified first frequency (e.g., the lowest frequency or frpacket) within the specified operating frequency range, the processor 520 according to an embodiment may control to transmit a notification message indicating that power transmission is not performed normally to the external electronic device 302 (send position warning packet). For example, the notification message may include information indicating that the exterior cover of the electronic device 501 should be removed or/and adjustment is required to align the external electronic device 302 at a position for wireless power transmission with respect to the electronic device 501. According to an embodiment, when the operating voltage is equal to or greater than the specified first voltage (e.g., the highest voltage) within the specified operating voltage range and the operating frequency frop is equal to or lower than the specified first frequency (e.g., the lowest frequency or frpacket) within the specified operating frequency range during the power transmission, the electronic device 501 may transmit the notification message and control the charging IC 516 and the MFC IC 514 to discontinue the power transmission operation.

Figure 8A:
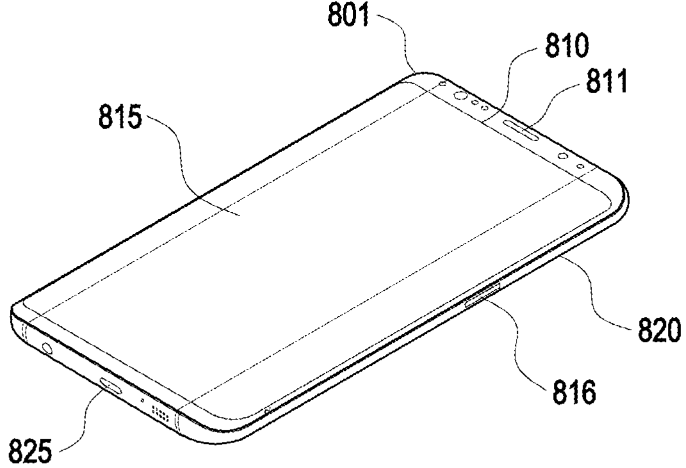
FIG. 8A is a front exterior perspective view illustrating an electronic device according to various embodiments.
Figure 8B:
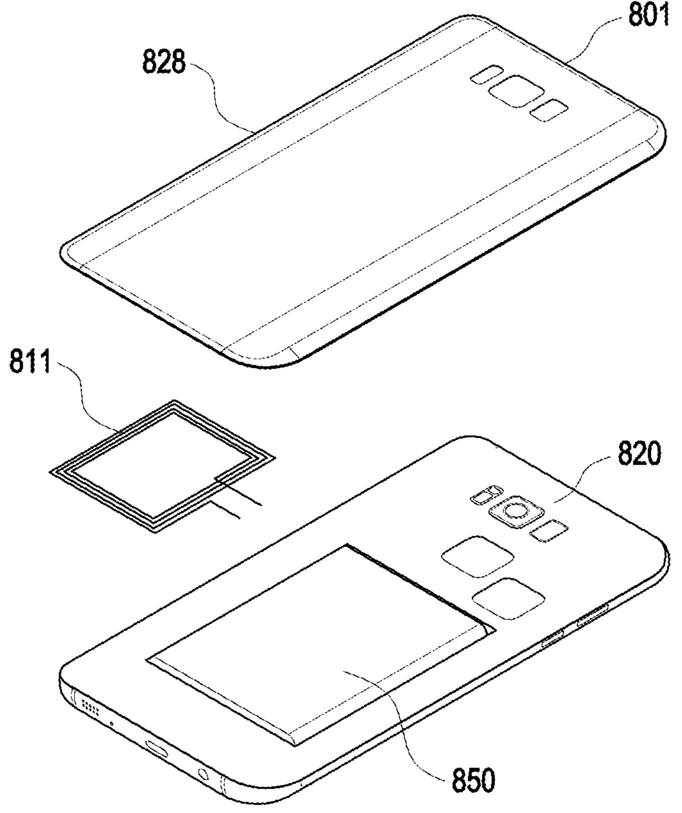
FIG. 8B is an exploded perspective view of an electronic device illustrating a case in which at least one coil is disposed between a main body and a rear cover in an electronic device according to various embodiments.

FIG. 8A is a front perspective view illustrating an electronic device according to various embodiments, and FIG. 8B is an exploded perspective view of an electronic device illustrating a case in which at least one coil is disposed between a main body and a rear cover in an electronic device according to various embodiments.

Referring to FIG. 8A, a touch screen 815 may be disposed at the center of a front surface 810 of a housing of an electronic device 801 according to an embodiment. The touch screen 815 may be large enough to occupy most of the front surface 810. The touch screen 815 may display various screens. At least one button 816 may be disposed on a side surface 820 of the housing. A screen may be displayed on the touch screen 815 based on pressing of the at least one button 816. A speaker 811 may be disposed at an upper part of the front surface 810 of the electronic device 801. A connector 825 connectable wiredly to an external device may be formed on a bottom surface of a main body 820 of the electronic device 801. According to various embodiments, at least one coil (or at least one conductive pattern) of an antenna module may be disposed at various positions in the body 820.

Referring to FIG. 8B, the electronic device 801 according to an embodiment may include the main body 820 and a rear cover 828 detachably attached on a rear surface of the main body 820, and at least one coil 811 may be disposed between the main body 820 and the rear cover 828. A battery 850 may be mounted on the rear surface of the main body 810, and the rear cover 828 may be coupled with the main body 820 having the battery 850 mounted thereon to form the housing. In another example, the at least one coil 811 may be attached to the rear cover 828 or molded inside the rear cover 828. In another example, the at least one coil 811 may be attached to the battery 850.

Figure 9:
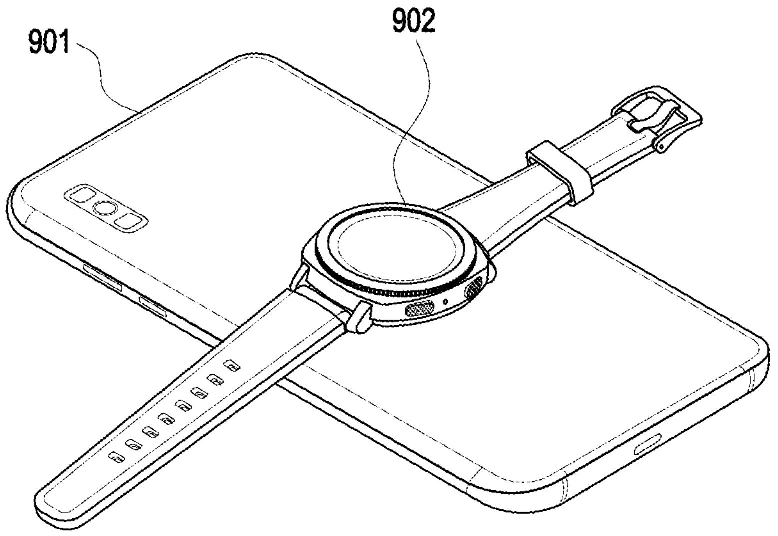
FIG. 9 is a diagram illustrating an example in which an electronic device is wirelessly transmitting power to an external electronic device according to various embodiments.

FIG. 9 is a diagram illustrating an example in which an electronic device is wirelessly transmitting power to an external electronic device according to various embodiments.

Referring to FIG. 9, an electronic device 901 according to an embodiment (e.g., the electronic device 101 of FIG. 1, the electronic device 201 of FIG. 2, the electronic device 301 of FIG. 3, or the electronic device 501 of FIG. 5) may be a smartphone, and an external electronic device 902 (e.g., the external electronic device 201 of FIG. 2 or the electronic device 301 of FIG. 3) may be a smart watch. However, it will be understood that the disclosure is not limited thereto.

In a state in which the electronic device 901 and the external electronic device 902 according to an embodiment are close to each other by a specified recognition distance, the electronic device 901 may transmit a wireless power transmission signal to the external electronic device 902 through at least one coil (e.g., 811 in FIG. 8) on a rear surface of the electronic device 901 and at least one coil (not shown) of the external electronic device 902. When the recognition distance between the electronic device 901 and the external electronic device 902 according to an embodiment is short, specified power transmission efficiency may be maintained in spite of a low operating voltage. When the recognition distance increases, the specified power transmission efficiency may not be maintained at a low operating voltage. According to an embodiment, use of a fixed operating voltage in the electronic device 901 may result in a decreased efficiency or non-recognition according to a recognition distance. For example, although the electronic device 901 may maintain a specified efficiency at a short recognition distance (or a small degree of misalignment) in the case of using a low fixed voltage (e.g., 5V), it may suffer from a rapid efficiency decrease or non-recognition at a long recognition distance (or a large degree of misalignment). In another example, when the electronic device 901 uses a high fixed voltage (e.g., 7.5V), the efficiency does not decrease at a long recognition distance (or a large degree of misalignment) and the probability of non-recognition may be small. However, the electronic device 901 may be highly probable to continuously receive a power control packet requesting to lower a power magnitude from the external electronic device 902, at a short recognition distance (or a small degree of misalignment). In this case, a decrease in power magnitude through duty control may shorten a period including a packet transmitted by the external electronic device in an inband, thereby causing frequent communication errors due to low packet availability in the electronic device 901.

When the electronic device 901 according to an embodiment performs an adaptive operating voltage changing operation (e.g., at least some or all of operations 610 to 640 of FIG. 6) during wireless power transmission to the external electronic device 902 or performs a wireless power transmission operation (e.g., at least some or all of operations 710 to 790 of FIG. 8) based on an adaptive operating voltage change, efficiency may be higher than in the case of using a fixed operating voltage.

Figure 10A:
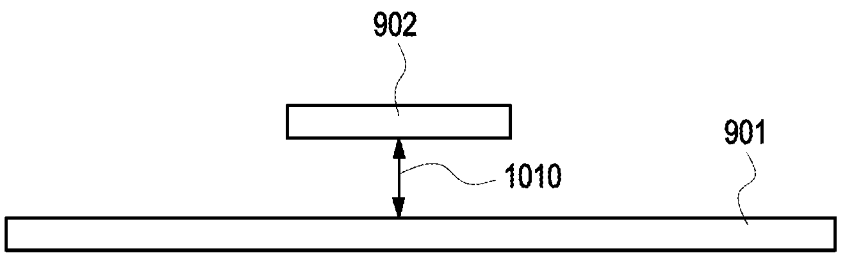
FIGS. 10A, 10B and 10C are diagrams illustrating an example adaptive operating voltage change according to a recognition distance between an electronic device and an external electronic device according to various embodiments.
Figure 10B:
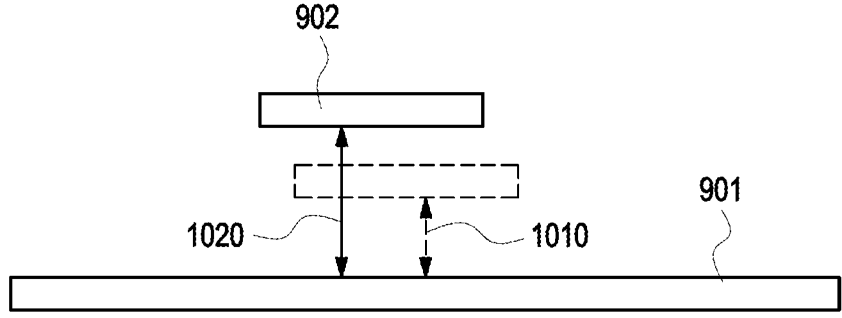
Figure 10C:
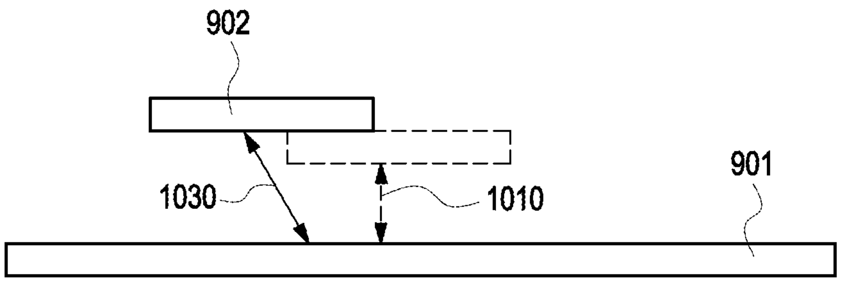

FIGS. 10A, 10B and 10C are diagrams illustrating example adaptive operating voltage change according to a recognition distance between an electronic device and an external electronic device according to various embodiments.

Referring to FIGS. 10A, 10B and 10C (which may be referred to as FIGS. 10A to 10C) the recognition distance between the electronic device 901 and the external electronic device 902 may depend on various conditions including a physical distance or/and alignment between the electronic device 901 and the external electronic device 902.

Referring to FIG. 10A, the electronic device 901 and the external electronic device 902 according to an embodiment may have a first recognition distance 1010 having a first alignment state at a first distance based on a vertical axis (e.g., z axis).

Referring to FIG. 10B, the electronic device 901 and the external electronic device 902 according to an embodiment may have a second recognition distance 1020 having the first alignment state at a second distance greater than the first distance based on the vertical axis (e.g., z axis) due to a factor such as the thickness of a cover.

Referring to FIG. 10C, the electronic device 901 and the external electronic device 902 according to an embodiment may have a third recognition distance 1030 having a second alignment state at the first distance based on the vertical axis (e.g., z axis).

Table 2 below is a table referred to for describing an adaptive operating voltage change according to a relationship between an operating voltage and a recognition distance between the electronic device 901 and the external electronic device 902 according to an embodiment.

TABLE 2

| Recognition distance | Operating frequency 5 V | 6 V | 7 V | Operating voltage (expected value) |
|---|---|---|---|---|
| 0T | 148 khz | 148 khz | 148 khz | 5 V |
| 1T | 135 khz | 148 khz | 148 khz | 5.5 V |
| 2T | 118 khz | 129 khz | 148 khz | 6 V |
| 3T | x | 114 khz | 137 khz | 6.5 V~7 V |
| 4T | x | x | 117 khz | x |
| 5T | x | x | x | x |

Referring to Table 2, OT to 5T may be recognition distances based on the thickness of the cover, a physical distance, or/and alignment of the cover. Since the electronic device 901 is capable of identifying an operating frequency even at a short recognition distance (e.g., about OT to 2T) at 5V, the electronic device 901 may adjust transmission power by adjusting the operating frequency, whereas it may not further reduce the operating frequency at a long recognition distance (e.g., about 3T to 5T), which makes it difficult to adjust the transmission power. The electronic device 901 may change the operating frequency even at a short recognition distance (e.g., about OT to 3T) at 6V, and thus adjust the transmission power by adjusting the operating frequency. When the recognition distance is great (e.g., about 4T to 5T), the electronic device 901 may not further reduce the operating frequency and thus have difficulty in adjusting the transmission power by adjusting the operating frequency. The electronic device 901 may change the operating frequency even at a short recognition distance (e.g., about OT to 4T) at 7V, and thus adjust the transmission power by adjusting the operating frequency. When the recognition distance is great (e.g., about 5T), the electronic device 901 may not further reduce the operating frequency and thus have difficulty in adjusting the transmission power by adjusting the operating frequency. According to an embodiment, as the electronic device 901 changes the operating voltage based on identification of an operating frequency according to a recognition distance, the electronic device 901 may use a low voltage (e.g., about 5V) as the operating voltage in the case of a short recognition distance, whereas it may use a high voltage (e.g., about 7V) as the operating voltage in the case of a long recognition distance. Therefore, wireless power transmission efficiency may be increased, and a non-recognition probability may be decreased.

Figure 11:
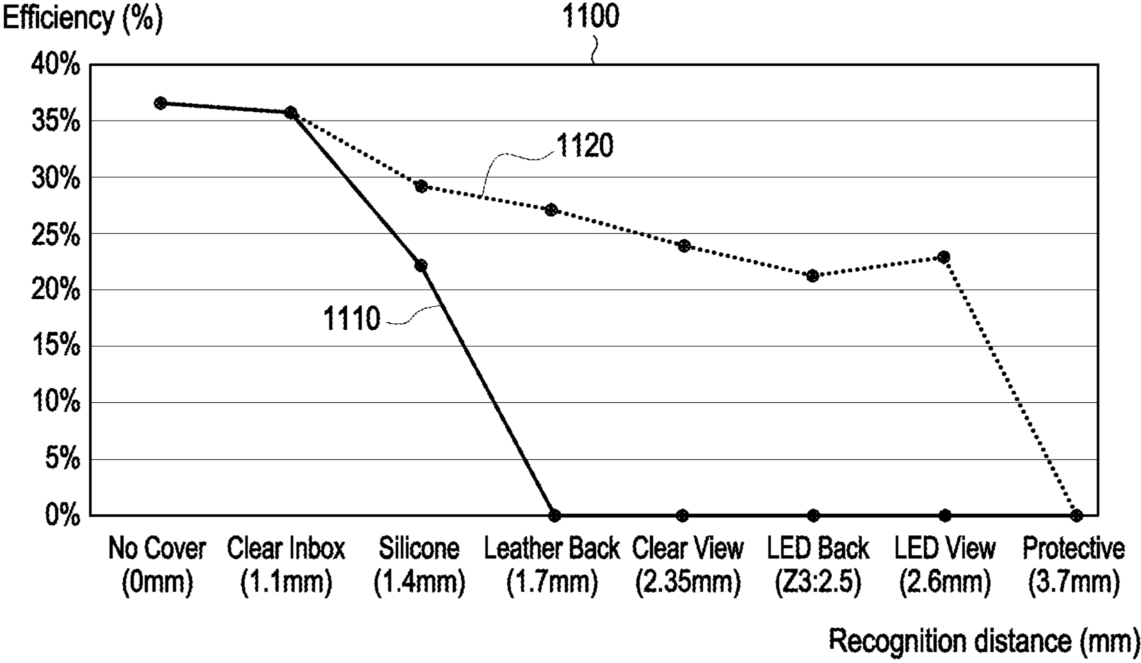
FIG. 11 is a graph illustrating efficiencies corresponding to using a fixed voltage and a case of using an adaptive operating voltage during wireless power transmission in an electronic device according to various embodiments.

FIG. 11 is a graph illustrating efficiencies corresponding to a case of using a fixed voltage and a case of using an adaptive operating voltage during wireless power transmission in an electronic device according to various embodiments.

Referring to FIG. 11, in a graph 1100 according to an embodiment, a horizontal axis may represent a recognition distance (mm) between the electronic device 901 and the external electronic device 902. A vertical axis may represent efficiency (%) (e.g., reception power at a receiving side/transmission power*100), when power is wirelessly transmitted from the electronic device 901 to the external electronic device 902.

According to an embodiment, reference numeral 1110 may denote an efficiency curve for wireless power transmission based on a fixed operating voltage. According to an embodiment, reference numeral 1120 may denote an efficiency curve for wireless power transmission based on an adaptive operating voltage.

For example, in the case of wireless power transmission using a fixed operating voltage, the efficiency may be good below a recognition distance of about 1.4 mm (e.g., a silicon cover (about 1.4 mm)) and rapidly decrease at or above the recognition distance of about 1.4 mm. In contrast, in the case of wireless power transmission based on an adaptive operating voltage, according to an embodiment, the efficiency may not rapidly decrease even at or above the recognition distance of about 1.4 mm (e.g., a silicon cover (about 1.4 mm)).

According to various embodiments, an electronic device may increase power transmission efficiency by adjusting an operating frequency and a duty on an operating voltage basis while adaptively changing an operating voltage.

According to various embodiments, when an operating frequency is lower than a lowest frequency within a specified operating frequency range or higher than a highest frequency within the specified operating frequency range during wireless power transmission, the electronic device may increase power transmission efficiency, widen a charging recognition area, and thus secure charging safety by adaptively changing an operating voltage.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various example embodiments, in a non-transitory computer-readable storage medium storing instructions which, when executed by at least one processor of an electronic device, cause the electronic device to perform at least one operation, the at least one operation may include: identifying an operating frequency through a magnetic field controller circuit during wireless power transmission to outside of the electronic device through an antenna module, identifying whether the identified operating frequency is included in at least one operating voltage-changing frequency section within a specified operating frequency range, and based on the operating frequency being included in the at least one operating voltage-changing frequency section, changing an operating voltage of a charging circuit.

Regarding embodiments of the disclosure and the drawings, specific examples are provided to facilitate description of the technical content of the various example embodiments of the disclosure and aid in understanding of the embodiments of the disclosure, and is not intended to limit the scope of the disclosure. Accordingly, the scope of the disclosure should be interpreted as encompassing all variations or modifications derived from the technical idea of various embodiments of the disclosure in addition to the embodiments disclosed herein. It will also be understood that any of the embodiment(s) described herein may be used in conjunction with any other embodiment(s) described herein.

What is claimed is:

1. An electronic device comprising:

a power supply unit comprising a power supply;

an antenna module comprising at least one antenna;

a magnetic field controller circuit electrically connected to the antenna module;

a charging circuit electrically connected to the power supply unit and the magnetic field controller circuit;

memory storing instructions; and at least one processor, wherein the instructions, when executed by the at least one processor, cause the electronic device to:

identify an operating frequency through the magnetic field controller circuit during wireless power transmission to outside of the electronic device through the antenna module using power supplied from the power supply unit, based on the identified operating frequency being included between a lowest frequency and a first operating threshold frequency or between a second operating threshold frequency higher than the first operating threshold frequency and a highest frequency within a specified operating frequency range, change an operating voltage of the charging circuit from a first operating voltage to a second operating voltage different from the first operating voltage;

based on the identified operating frequency being included between the first operating threshold frequency and the second operating threshold frequency within the specified operating frequency range, maintain the operating voltage of the charging circuit as the first operating voltage.

2. The electronic device of claim 1, wherein when the identified operating frequency is between the lowest frequency and the first operating threshold frequency within the specified operating frequency range, the first operating voltage is less than the second operating voltage by a specified value.

3. The electronic device of claim 1, wherein when the identified operating frequency is between the second operating threshold frequency and the highest frequency within the specified operating frequency range, the first operating voltage of the charging circuit is greater than the second operating voltage by a specified value.

4. The electronic device of claim 2, wherein the instructions, when executed by the at least one processor, cause the electronic device to adjust power transmitted to outside of the electronic device through the antenna module without changing the operating voltage, based on the identified operating frequency being between the first operating threshold frequency and the second operating threshold frequency.

5. The electronic device of claim 1, wherein the operating voltage is be changed within a specified operating voltage range.

6. The electronic device of claim 5 wherein the instructions, when executed by the at least one processor, cause the electronic device to generate a message indicating that power transmission is not performed normally, based on the operating voltage being equal to or greater than a specified voltage within the specified operating voltage range, and the identified operating frequency being equal to or lower than a specified frequency within the specified operating frequency range during the wireless power transmission.

7. The electronic device of claim 5, wherein the instructions, when executed by the at least one processor, cause the electronic device to discontinue the wireless power transmission, based on the operating voltage being equal to or greater than a specified voltage within the specified operating voltage range, and the identified operating frequency being equal to or lower than a specified frequency within the specified operating frequency range during the wireless power transmission.

8. The electronic device of claim 5, wherein the specified operating voltage range includes a range of 5V to 7.5V.

9. The electronic device of claim 1, wherein the specified operating frequency range is 110khz to 148khz, the first operating threshold frequency is 125khz, and the second operating threshold frequency is 147khz.

10. A method of transmitting wireless power based on an adaptive operating voltage in an electronic device, the method comprising:

identifying an operating frequency through a magnetic field controller circuit during wireless power transmission to outside of the electronic device through an antenna module;

based on the identified operating frequency being included between a lowest frequency and a first operating threshold frequency or between a second operating threshold frequency higher than the first operating threshold frequency and a highest frequency within a specified operating frequency range, changing an operating voltage of the charging circuit from a first operating voltage to a second operating voltage different from the first operating voltage;

based on the identified operating frequency being included between the first operating threshold frequency and the second operating threshold frequency within the specified operating frequency range, maintaining the operating voltage of the charging circuit as the first operating voltage.

11. The method of claim 10, wherein when the identified operating frequency is between the lowest frequency and the first operating threshold frequency within the specified operating frequency range, the first operating voltage is less than the second operating voltage by a specified value.

12. The method of claim 10, wherein when the operating frequency is between the second operating threshold frequency and the highest frequency within the specified operating frequency range, the first operating voltage of the charging circuit is greater than the second operating voltage by a specified value.

13. A non-transitory computer-readable storage medium storing instructions which, when executed by at least one processor of an electronic device, cause the electronic device to perform at least one operation, comprising:

identifying an operating frequency through a magnetic field controller circuit during wireless power transmission to outside of the electronic device through an antenna module;

based on the identified operating frequency being included between a lowest frequency and a first operating threshold frequency or between a second operating threshold frequency higher than first operating threshold frequency and a highest frequency within a specified operating frequency range, changing an operating voltage of the charging circuit from a first operating voltage to a second operating voltage different from the first operating voltage;

based on the identified operating frequency being included between the first operating threshold frequency and the second operating threshold frequency within the specified operating frequency range, maintain the operating voltage of the charging circuit as the first operating voltage.

* * * * *